(12) United States Patent
Melaku et al.

(10) Patent No.: US 7,177,627 B2
(45) Date of Patent: Feb. 13, 2007

(54) METHOD AND APPARATUS FOR PROVIDING IMAGES FOR CALLER IDENTIFICATION OVER A MOBILE NETWORK

(75) Inventors: Makonnen Melaku, Metuchen, NJ (US); Arda Aksu, Watertown, MA (US); Seshadri Mohan, Basking Ridge, NJ (US)

(73) Assignee: Comverse, Inc., Wakefield, MA (US)

( * ) Notice: Subject to any disclaimer, the term of this patent is extended or adjusted under 35 U.S.C. 154(b) by 709 days.

(21) Appl. No.: 09/907,535

(22) Filed: Jul. 17, 2001

(65) Prior Publication Data

US 2003/0032414 A1 Feb. 13, 2003

(51) Int. Cl.
*H04M 3/42* (2006.01)
(52) U.S. Cl. ............. 455/414; 379/142.06; 379/142.17
(58) Field of Classification Search ........... 379/142.04, 379/142.06, 142.17, 201.01, 88.01, 93.23, 379/93.25
See application file for complete search history.

(56) References Cited

U.S. PATENT DOCUMENTS 5,073,927 A 12/1991 Grube (Continued)

FOREIGN PATENT DOCUMENTS

JP 63212252 9/1988

(Continued)

OTHER PUBLICATIONS

"*3G Messaging Applications*", Presentation by MORPACE International Ltd. Feb. 2001.

(Continued)

*Primary Examiner*—Fan Tsang
*Assistant Examiner*—Olisa Anwah
(74) *Attorney, Agent, or Firm*—Mintz, Levin, Cohn, Ferris, Glovsky and Popeo, P.C.

(57) ABSTRACT

Picture Caller Line Identification (PCLI) systems and methods are provided for enabling present and future mobile telephony systems to provide PCLI information to a called party. A PCLI system that interacts with a mobile telephony system includes a storage unit for storing PCLI information and a processor that is programmed to detect a request for a call from a caller to a called party, to retrieve PCLI information for the caller from the storage unit, and to forward the PCLI information to the called party. The processor may be further programmed to suspend completion of the call until verification of receipt of the call by the called handset to ensure that the PCLI information is available at the called party's handset prior to completion of the call. Mobile handsets that may be used with the PCLI system discussed above are also provided. A mobile handset for operating with a PCLI system includes an input to receive an image associated with a caller and to receive notification of the call from the caller, and a display that displays the images. The handset also includes a processor that is programmed to receive the image, to receive the notification of the call from the caller, and to respond to the caller. The processor may be programmed to send the image to the display after receiving the notification of the call from the caller.

27 Claims, 7 Drawing Sheets

U.S. PATENT DOCUMENTS

| | | |
|---|---|---|
| 5,465,290 A | 11/1995 | Hampton et al. |
| 5,546,447 A | 8/1996 | Skarbo et al. |
| 5,559,868 A | 9/1996 | Blonder |
| 5,586,171 A | 12/1996 | McAllister et al. |
| H1714 H | 3/1998 | Partridge |
| 5,761,279 A | 6/1998 | Bierman et al. |
| 5,867,562 A | 2/1999 | Scherer |
| 5,875,239 A | 2/1999 | Koralewski et al. |
| 5,907,604 A * | 5/1999 | Hsu ..................... 379/142.06 |
| 5,999,599 A | 12/1999 | Shaffer et al. |
| 6,018,571 A | 1/2000 | Langlois et al. |
| 6,046,762 A | 4/2000 | Sonesh et al. |
| 6,047,053 A * | 4/2000 | Miner et al. ........... 379/201.01 |
| 6,078,807 A | 6/2000 | Dunn et al. |
| 6,081,750 A | 6/2000 | Hoffberg et al. |
| 6,137,870 A | 10/2000 | Scherer |
| 6,154,531 A | 11/2000 | Clapper |
| 6,175,741 B1 | 1/2001 | Alperovich |
| 6,178,230 B1 | 1/2001 | Borland |
| 6,185,288 B1 | 2/2001 | Wong |
| 6,188,751 B1 | 2/2001 | Scherer |
| 6,192,257 B1 | 2/2001 | Ray |
| 6,226,367 B1 | 5/2001 | Smith et al. |
| 6,243,448 B1 | 6/2001 | Corbett et al. |
| 2001/0053705 A1* | 12/2001 | Hull ........................... 455/557 |
| 2004/0127218 A1* | 7/2004 | Paik et al. ............... 455/435.1 |
| 2004/0196966 A1* | 10/2004 | Bushnell .................. 379/88.19 |
| 2004/0240651 A1* | 12/2004 | Adams et al. ......... 379/142.08 |

FOREIGN PATENT DOCUMENTS

| | | |
|---|---|---|
| JP | 3145248 | 6/1991 |
| JP | 3190348 | 8/1991 |
| WO | WO 00/14945 | 3/2000 |
| WO | WO 00/78021 | 12/2000 |

OTHER PUBLICATIONS

3G TS 23.040, "Technical Realization of the Short Message Service (SMS)", Third Generation Partnership Project (3GPP) technical specification:.

"Connected, Limited Device Configuration", Specification Version 1.0, Java 2 Platform Micro Edition by SUN Microsystems, May 2000. (http://java.sun.com/j2me/docs/).

"NEC's DB7000 mobile telephone with "look who's calling" and "Picture CLI" features". (http://www.nec-cebit.com/engw/product/mobil170.htm).

Graphics downloadable into a mobile telephone, wherein the telephone will display one of the graphics if someone from a predefined group of telephone numbers calls the mobile telephone. (http://www.cellular.co.za/graphics.htm).

User-definable graphics that can be downloaded and used as described on http://www.cellular.co.za/draw_icon.htm.

* cited by examiner

METHOD AND APPARATUS FOR PROVIDING IMAGES FOR CALLER IDENTIFICATION OVER A MOBILE NETWORK

FIELD OF THE INVENTION

The present invention relates generally to methods and apparatus for providing images over a mobile communications network, and more specifically to systems and methods for providing picture caller line identification in a mobile communications network.

BACKGROUND OF THE INVENTION

The use of caller line identification (known as CLID, CLI or CID) systems in landline telephone systems as well as mobile telephone systems is well known. In a typical CID system, the name and or telephone number of a caller is provided on a display of the called party soon after the called party's telephone begins to ring. United States Statutory Invention Registration No. H1714, published Mar. 3, 1998, describes a caller identification system that, in addition to sending the name and telephone number of a caller, also sends an image associated with the calling party.

The caller identification system disclosed in SIR H1714 is for use in a conventional (landline) telephone system. In conventional systems there is typically sufficient bandwidth available in the telephone system, such that the additional bandwidth required to send an image with other caller identification information does not interfere with the signaling required to establish a call between the calling party and the called party. In typical mobile applications, the bandwidth available for caller identification in existing networks is limited and cannot typically support the sending of a caller's image along with other caller identification information. Future generation networks (including third generation networks) are being designed with additional bandwidth to support additional service features, however, these networks are not expected to be deployed on a wide scale until well into the future.

SUMMARY OF THE INVENTION

An object of the present invention is to provide a picture caller line identification (PCLI) system and method for use in existing mobile networks (including 2G and 2.5G networks) as well as in future mobile networks (3G and beyond).

Another object of the invention is to provide a mobile telephony handset usable with systems of the present invention to provide PCLI information to a called party using the handset.

A further object of the invention is to allow a PCLI system subscriber to store and edit the user's PCLI information in the system.

Still another object of the invention is to provide a multi-caller PCLI system and method that allows multiple users of a handset to be individually identified by a called party by the use of speaker voice recognition methods.

One or more of the above objects are met in embodiments of the present invention. In a first such embodiment, a PCLI system is provided that interacts with a mobile telephony system to provide a caller's PCLI information to a called party. The system may include a storage unit for storing PCLI information and a processor that is programmed to detect a request for a call from a caller to a called party, to retrieve PCLI information for the caller from the storage unit, and to forward the PCLI information to the called party. The processor may be further programmed to suspend completion of the call until verification of receipt of the call by the called handset to ensure that the PCLI information is available at the called party's handset prior to completion of the call. The PCLI information may be sent over a network, such as an enhanced short message system (EMS) network, different from the network used to complete the call. The PCLI information may be stored in the storage unit by a user by accessing the storage unit over the Internet. The user may also edit PCLI information over the Internet.

Embodiments of the present invention are also directed to mobile handsets that may be used with the PCLI system discussed above. In one such embodiment, a mobile handset for receiving a call from a caller over a mobile telephony system has an input to receive an image associated with a caller and to receive notification of the call from the caller, and a display that displays the images. The handset also includes a processor that is programmed to receive the image, to receive the notification of the call from the caller, and to send the call to the caller. The processor may be programmed to send the image to the display after receiving the notification of the call from the caller. Further, to provide synchronization between the display of PCLI information and receipt of the call, the PCLI information may be displayed after the first ring indicating that a new call has been received. In one particular embodiment, prior to displaying the PCLI information, CLID information received with the call may be compared to the PCLI information to ensure that the PCLI information is the correct PCLI information for the present caller.

Embodiments of the present invention are also directed to multi-caller PCLI systems and methods. In one such embodiment, a voice call manager (VCM) is included in a PCLI system. The voice call manager is configured to identify a specific user of a handset from a number of registered users of the handset. The VCM may then communicate with the PCLI system to allow PCLI data for that particular user to be forwarded to a called party.

Embodiments of the present invention are also directed to methods that perform the functions of the systems and the handsets described above, as well as storage media for containing computer operating instructions for performing the functions of the systems and the handsets.

BRIEF DESCRIPTION OF THE DRAWINGS

For a better understanding of the present invention, reference is made to the drawings, which are incorporated herein by reference and in which.

DETAILED DESCRIPTION

Embodiments of the present invention described herein provide picture caller line identification (PCLI) information for called parties in mobile telephone systems. As understood by those skilled in the art, particular embodiments of the present invention are not limited for use in mobile telephone systems, but also may be used with landline systems or for calls between landline systems and mobile telephone systems.

Figure 1:
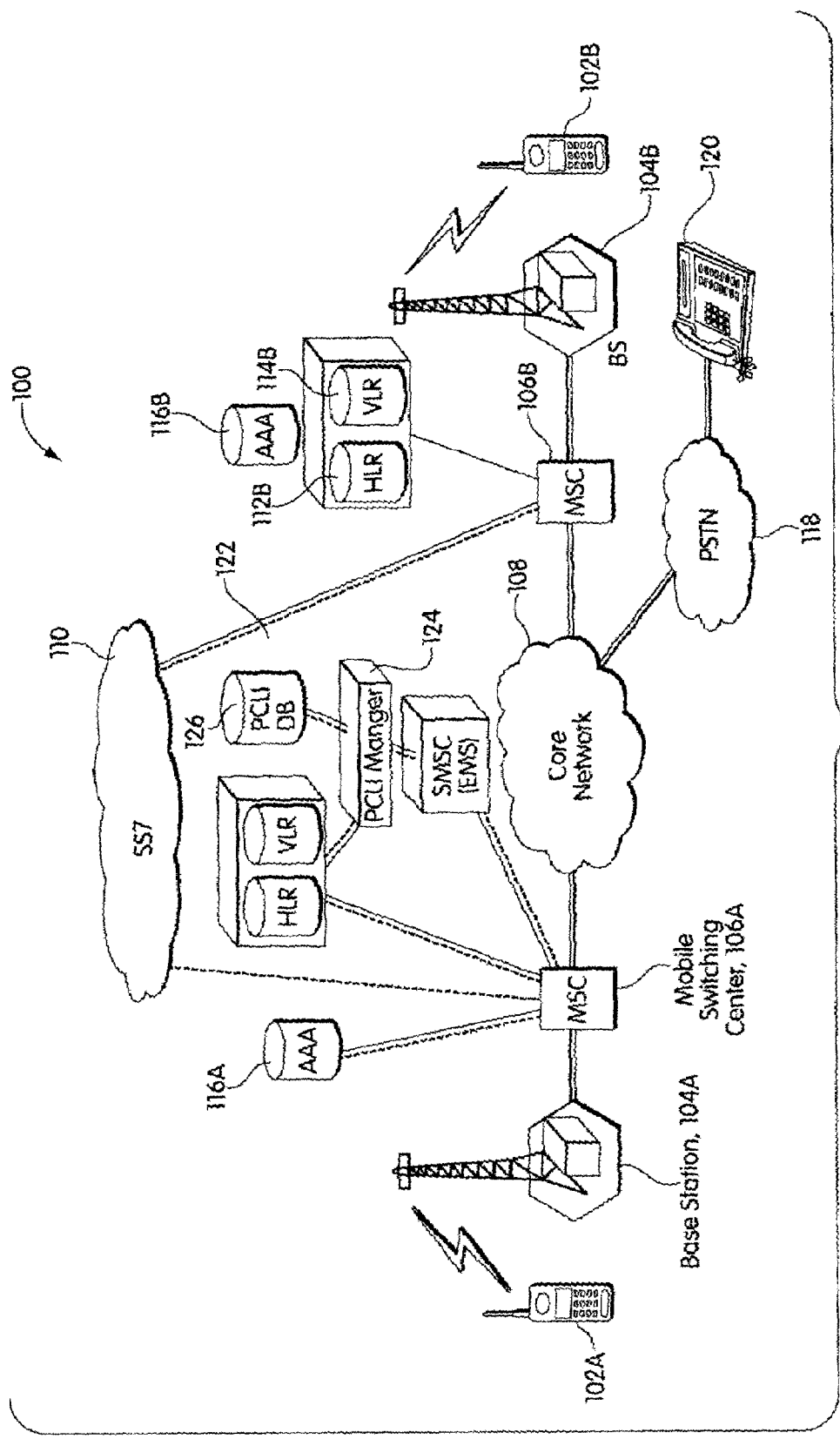
FIG. 1 is a functional block diagram of a mobile telephone system in accordance with a first embodiment of the present invention.

FIG. 1 shows a functional block diagram of a telephone system 100 having picture caller line identification in accordance with a first embodiment of the present invention. The mobile telephone system includes first and second handsets 102A and 102B, first and second base stations 104A and 104B, first and second Mobile Switching Centers (MSC) 106A and 106B, a core network 108, a Short Message Service Center (SMSC) 109 and a Signaling System 7 (SS7) network 110. As shown in FIG. 1, the system 100 may be coupled to a PSTN network 118, which in turn is coupled to a landline handset 120. Each mobile switching center has a Home Location Registration database (HLR) 112A and 112B, a Visitor Location Registration database (VLR) 114A and 114B, and an Authentication, Authorization and Accounting (AAA) server 116A and 116B. The first mobile switching center 106A also includes a Picture Caller Line Identification (PCLI) subsystem 122 that includes a PCLI manager 124 and a PCLI database 126. Although not shown in FIG. 1, the second mobile switching center may also include a PCLI subsystem.

With the exception of the PCLI subsystem 126, the components of the mobile telephone system 100 are well known to those skilled in the art. Also, as described below, in some embodiments of the present invention, the second mobile handset 102B (as well as the first mobile handset 102A) may be modified to provide additional functionality to support picture caller line identification.

In one embodiment of the present invention, the PCLI manager 124 is implemented as a software module operating on one or more servers that are performing functions of the first mobile switching center 106A or on servers that communicate with the mobile switching center and perform some other network function, such as a voice mail system or a call manager system. In other embodiments, the PCLI manager may be implemented using software and/or hardware contained in one or more servers, coupled to the mobile switching center 106A, and having one or more processors. As described below, the PCLI manager performs functions to coordinate the flow of PCLI information in system 100. The PCLI database may be an independent database contained on a dedicated storage system, or may be contained within a common storage device with the HLR database and/or VLR database or may be part of another third-party database. The PCLI database is used to store PCLI information for PCLI subscribers.

Figure 2:
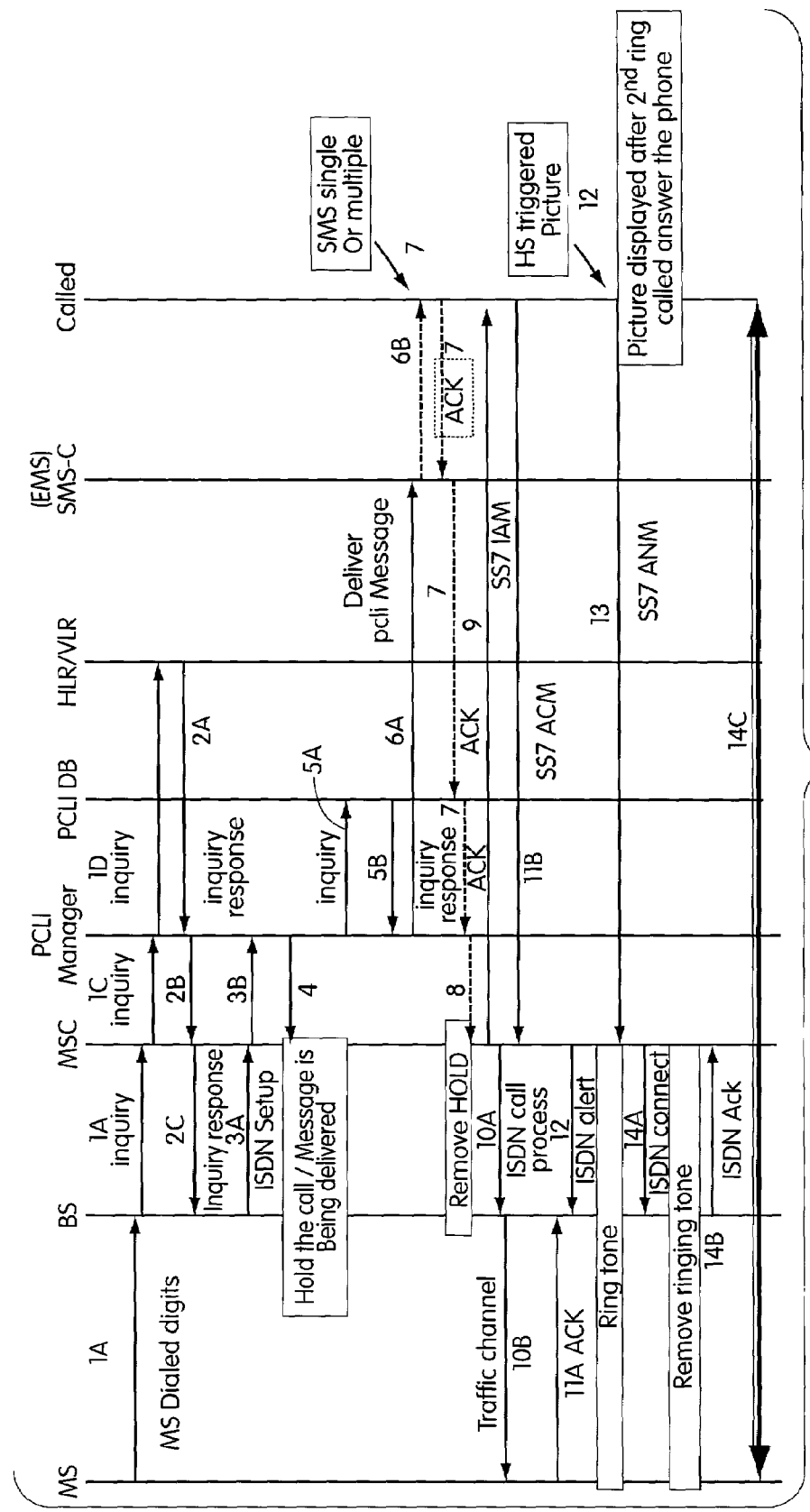
FIG. 2 is a signaling flow diagram that provides step-by-step flow of the signaling procedure of a telephone system to accomplish picture caller line identification in a mobile handset to mobile handset call in embodiments of the present invention.

A method for operating the system 100 to complete a call from a mobile station (handset 102A) to another mobile station (handset 102B) using picture caller line identification in accordance with one embodiment of the present invention will now be described with reference to FIG. 2. FIG. 2 is a signaling flow diagram of the signaling procedure used for PCLI in the system 100. The mobile station initiates (1A) a call using an access channel to the first base station 104A. The call is passed (1B) from the first base station 104A to the first mobile switching center 106A. The first mobile switching center 106A receives the call and queries (1C and 1D) the home location register 112A or the visitor location register 114A, depending on whether the mobile station is operating in its home network or a visited network. The query, and the response to the query, is either passed through the PCLI manager or monitored by the PCLI manager to allow the PCLI manager to determine whether the caller is a subscriber of a PCLI service. The HLR database or VLR database then queries the AAA server.

Upon receiving validation, the HLR or the VLR responds (2A and 2B) to the request from the first mobile switching station 106A with the mobile station's user's profile acknowledgement. The first mobile switching system then sends (2C) to the first base station the user's profile response. The first base station 104A then sends (3A) an ISDN setup message to the first mobile switching center 106A, and the ISDN setup message is detected (3B) by the PCLI manager 124. If the caller is a PCLI subscriber, the PCLI manager then instructs (4) the first mobile switching center to hold or suspend the call.

In the embodiment described above, the PCLI manager is programmed to monitor the data provided by the HLR and/or the VLR to the first mobile switching center to determine whether the caller is a PCLI subscriber. The PCLI manager then only instructs the first mobile switching center to hold the call when the caller is a PCLI subscriber. In another embodiment, the first mobile switching center, rather than the PCLI manager, may be programmed to monitor the data from the HLR and the VLR to detect PCLI subscribers.

While the call is suspended, the PCLI manager 124 queries (5A) the PCLI database 126 to map the caller line identification (CLI) information for the mobile station user to PCLI information (i.e., a picture of the caller) contained in the PCLI database for the user. The CLI information used in the mapping process is obtained from the first mobile switching station, which received the CLI information from the HLR or the VLR at point 2A. The PCLI information for the user is sent from the PCLI database to the PCLI manager at point 5B in the process.

The PCLI manager then forwards (6A) the PCLI information to the short message service center 109. The short message service center uses the Short Message Service Transport Protocol (SMTP) to send the PCLI information (6B) to the second handset 102B. The SMTP delivers the PCLI information to the handset using one single short message or multiple short messages depending on the amount of information to be sent. In embodiments of the present invention, the Enhanced Messaging Service (EMS) is used in conjunction with the short message service center. The EMS is an evolution of the Short Message Service (SMS) that can support text, picture animation and sound. The EMS is described further in $3^{rd}$ Generation Partnership Project: Technical Specification Group Terminals; Technical Realization of the Short Message Service (SMS), Release 4, which is incorporated herein by reference.

The PCLI information is then stored in memory in the second handset 102B. An acknowledgement of receipt (7) of the message by the second handset is sent to the short message service center by the second handset, and the short message service center then sends an acknowledgement to the PCLI manager. Next, at point 8 in the procedure, the PCLI manager instructs the first message service center 106A to remove the hold or suspension on the call and continue with the call setup.

Once the suspension is lifted, at point 9 in the procedure, the first mobile switching center 106A sends an SS7 ISDN setup message, an Initial Address Message (IAM), over the SS7 network to the second mobile switching center 106B. Upon receiving the IAM, the second mobile switching center makes a determination as to whether the called party is idle. At substantially the same time, the first mobile switching center sends (10A) an ISDN call message to the first base station 104A. The first base station then sends (10B) a traffic channel assignment message to the first handset 102A (or mobile station) through a paging channel. At point 11A, the first handset sends a signal to the first base station confirming the traffic channel assignment. While the first handset is confirming the traffic channel assignment, the second mobile switching center 106B sends (11B) back (over the SS7 Network) an Address Complete Message (ACM) to the first mobile switching center to indicate that it has received the IAM message. A ringing tone is also sent by the MSC 106A to the calling party's handset.

At point 12 in the procedure of FIG. 2, the first mobile switching center sends an ISDN alert to the first base station, and the ringing tone is then activated in the first mobile handset. After the second ring at the second mobile handset 102B, the stored PCLI information in the second mobile handset is retrieved and displayed. Once the call is answered at the second mobile handset, an SS7 Answer Message (ANM) is sent (13) to the first mobile switching center. After receiving the answer message, the first mobile switching center sends (14A) an ISDN connect message to the first base station and removes the ringing tone. The first base station sends (14B) an ISDN acknowledgement message to the first mobile switching center that the mobile station is connected. Finally, at point (14C) in the flow diagram of FIG. 2, the connection between the first mobile handset and the second mobile handset for conversation is established.

Using the procedure described above with reference to FIGS. 1 and 2, systems and methods in accordance with embodiments of the invention are able to use existing 2G and 2.5G mobile systems to provide picture caller line identification. Embodiments of the invention overcome drawbacks, including limited bandwidth, of existing systems by utilizing the enhanced messaging service as a second data path to send picture data for PCLI prior to the completion of a call to a mobile handset. In addition, the PCLI manager is used in embodiments to synchronize the completion of a call with the sending of PCLI information to ensure that the PCLI information is sent to the called party's handset prior to the ringing of the handset to indicate an incoming call. In addition, embodiments of the present invention provide solutions that may be used with 3G systems and future systems.

As described above, to accomplish synchronization of the display of picture data (and other PCLI information) with the receipt of an incoming call, the incoming call is held or suspended by the first mobile switching center while the PCLI data is sent to the second mobile handset. In one embodiment of the invention, the first mobile switching center will reject any new calls to the second mobile handset while the first call is on hold to eliminate the possibility of synchronization of a picture with the wrong calling party. Further, to prevent extended delays that may occur due to signaling errors, in one embodiment, the suspension of the call is automatically lifted after a period of time. In another embodiment, the call set up is terminated if the acknowledgement of delivery of the PCLI information is not received after a predetermined period of time.

The holding of the call at the MSC while the EMS completes the delivery of the PCLI information causes a delay in completing the call between the first handset and the second handset. It is desirable that the delay be minimized. In one embodiment of the present invention, it is desirable to use an EMS that is configured to forward messages immediately to minimize the call delay.

Enhanced messaging systems typically have a message length that is limited to 160 characters (1280 bits). In embodiments of the invention, to provide images larger than 1280 bits to support the use of larger pictures or images with improved resolution or color depth (either gray-level or RGB color), multiple EMS messages may be used. In addition, compression schemes, such as JPEG, may be used to reduce the amount of data to be sent by the EMS. As is known to those skilled in the art, JPEG compression can typically achieve a 15-to-1 compression ratio for color photographs without any visible loss in the picture. Gray scale images cannot typically be compressed by as large factors as color images, because the human eye is more sensitive to brightness variations than hue variations. Table 1 shows typical sizes of PCLI images that may be transmitted over an EMS in embodiments of the invention. Further compression of the images is possible, however, degradation of the images can become significant with further compression.

TABLE 1

Typical Pictures Sizes

| Case: | Pixels: | Color: (GL: Gray Level) RGB: Color | Raw Size: (Uncompressed) bits | JPEG Compressed: (bits) | Number of EMS Messages Needed: |
|---|---|---|---|---|---|
| 1 | 32 × 32 | 1-bit GL (B&W) | 1024 | 56 | 1 |
| 2 | 64 × 64 | 1-bit GL (B&W) | 4096 | 220 | 1 |
| 3 | 32 × 32 | 4-bit GL | 4096 | 220 | 1 |
| 4 | 64 × 64 | 4-bit GL | 16384 | 875 | 1 |
| 5 | 32 × 32 | 8-bit GL | 8192 | 438 | 1 |
| 6 | 64 × 64 | 8-bit GL | 32768 | 1748 | 2 |
| 7 | 32 × 32 | 4-bit RGB | 12288 | 820 | 1 |
| 8 | 64 × 64 | 4-bit RGB | 49152 | 3277 | 3 |
| 9 | 32 × 32 | 8-bit RGB | 24576 | 1639 | 2 |
| 10 | 64 × 64 | 8-bit RGB | 98304 | 6554 | 6 |

As discussed above, the suspension of a call by the first mobile switching center causes a delay in the completion of a call. In embodiments of the invention, by controlling the amount of PCLI data sent, by using compression and limiting the number of pixels in PCLI pictures, this delay can be minimized. Table 2 shows typical transmission times for PCLI picture data for embodiments of the present invention for typical 2.5G or 3G wireless networks. As is known to those skilled in the art, for IS-95-B or 1xRTT based systems, SMS/EMS messages are transmitted to a mobile handset by utilizing the paging logical channel, which is also used for overhead messages and paging messages. In such systems, the maximum information transmission rate is typically 9600 bps. The transmission times shown in Table 3 are based on the 9600 bps transmission rate. The exact transmission time for a particular image will depend on interference on a particular network, which may increase the transmission time due to the need to retransmit images, however, since the transmission times are on the order of milliseconds, the use of the EMS for delivery of PCLI data does not add considerable delays to the setup time for a call.

TABLE 2

Typical Transmission Times for Picture Delivery

| Case: | JPEG Compressed: (bits) | Typical transmission time for IS-95-B and 1 × RTT networks (2.5 G/3 G). Air interface transmission rate for SMS: Paging channel @9.6 kbps |
|---|---|---|
| 1 | 56 | 6 mili-seconds |
| 2 | 220 | 23 mili-seconds |
| 3 | 220 | 23 mili-seconds |
| 4 | 875 | 91 mili-seconds |
| 5 | 438 | 46 mili-seconds |
| 6 | 1748 | 0.19 seconds |
| 7 | 820 | 86 mili-seconds |
| 8 | 3277 | 0.35 seconds |
| 9 | 1639 | 0.18 seconds |
| 10 | 6554 | 0.69 seconds |

The above tables provide characteristics of black and white and color pictures that may be used with embodiments of the present invention. However, as understood by those skilled in the art, particular embodiments of the present invention may be limited to black and white pictures or black and white pictures with some additional levels of gray scale depending on the particular EMS system used and the particular handsets used.

Figure 3:
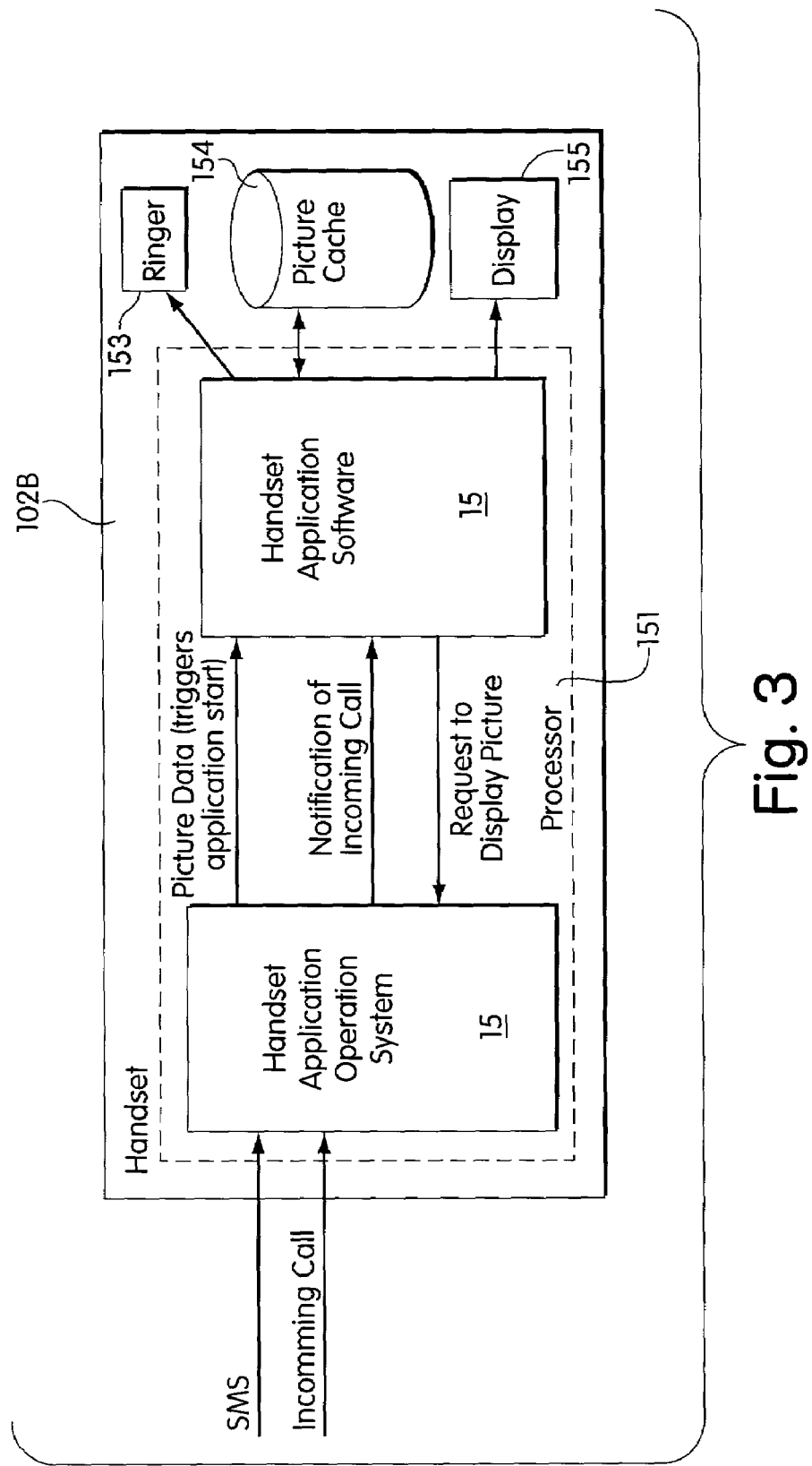
FIG. 3 is a functional block diagram of a mobile telephone handset used in embodiments of the present invention.

In embodiments of the present invention, as described above, the second mobile handset is designed to receive a PCLI image, and display the image after the first ring of a call from a caller associated with the PCLI image. In one embodiment of the invention, a typical handset that supports EMS may be loaded with an additional application that provides the functionality for PCLI. FIG. 3 shows a functional block diagram of the second mobile handset 102B used in one embodiment of the present invention. The handset 102B has a processor 151 having an application operation system functional block 150, and a PCLI application software block 152. The handset also includes a ringer 153, a picture cache 154 and a display 155. In different embodiments, the functions of the processor 151 in the handset 102B may be performed by software operating on multiple processors or by a combination of software and hardware.

Figure 4:
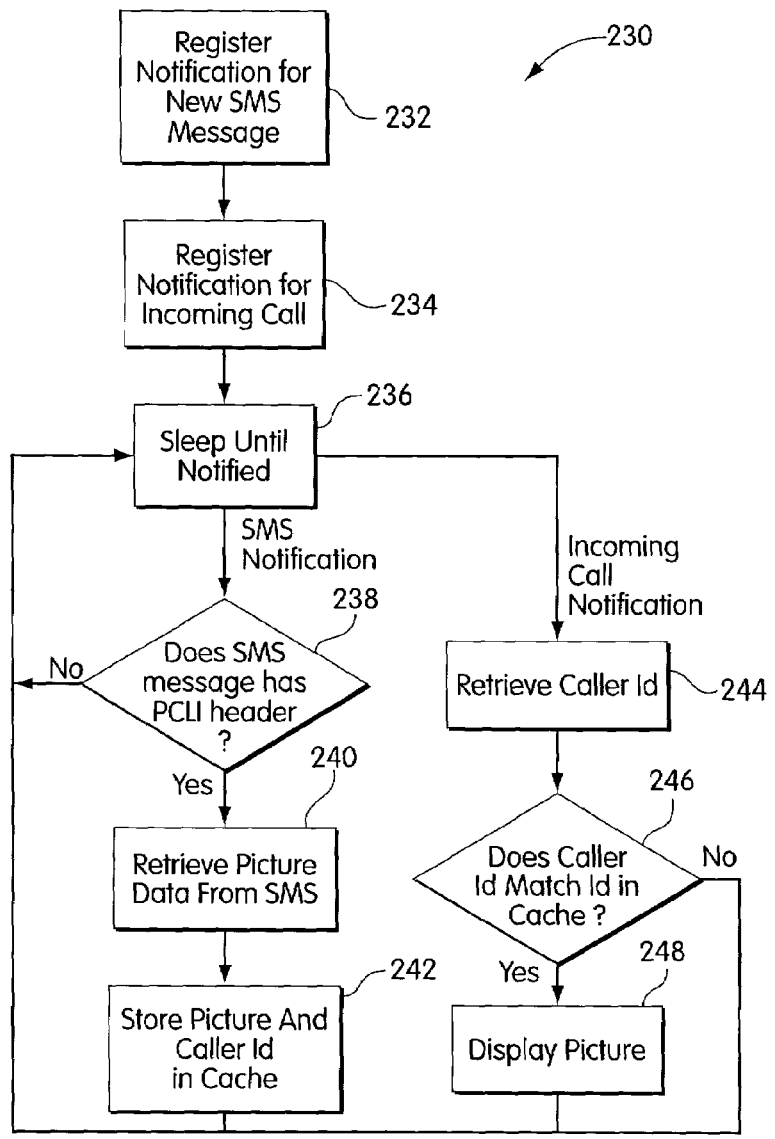
FIG. 4 is a flow chart of the operation of the handset of FIG. 3.

The operation of the handset 102B will now be described with reference to FIG. 4, which shows a flow chart of a process 230 for performing PCLI in the handset 102B. As shown in FIG. 4, the application software remains in a sleep mode 236 until notified that either a new SMS message 232 or a new call 234 has been received by the handset. Upon notification of a new SMS (or EMS) message, a determination is made 238 as to whether the message has a PCLI header. In one embodiment of the invention, the SMS message includes a PCLI identifier that can be detected at point 238 in the process. If the SMS message does not have a PCLI header then the process returns to the sleep mode. If the SMS message includes a PCLI header, then the PCLI picture (or other data) and caller ID data is retrieved 240 and stored in the picture cache 154.

Upon notification of receipt of a new call 232, the caller ID is retrieved for the call 244, and a determination is made 246 as to whether the caller ID for the call matches the caller ID for a picture in the picture cache. If there is no match, then the PCLI application software returns to the sleep mode 236. If there is a match, then the picture is displayed on the handset. As discussed above, in one embodiment, the picture is displayed after a first ring of the handset, however, in other embodiments, the picture may be displayed at some other point in the call connection process, or after the call has been fully connected. In one embodiment of the present invention, at least the second handset is implemented using an Ericcson Model R380 mobile telephone having Symbian's EPOC operating system, and application software to perform the functions described above.

In the process 230 described above, a match between the caller ID of a call and the caller ID of a PCLI picture in the cache is made prior to displaying the picture. In other embodiments, it is not necessary for a match to occur, and the handset will display the most recently received PCLI picture when a call is received. However, in one embodiment, the most recently received picture will only be displayed if another call is not received by the handset since the receipt of the PCLI picture and a present call. In still another embodiment, the most recently received picture will not be displayed if a predetermined time delay occurs between the receipt of the picture and the receipt of the call. In one embodiment, the picture cache is large enough to contain the data for one picture (and any corresponding PCLI data), and when a new picture is received, if there is an existing picture in the cache, the existing picture is overwritten by the new picture. In another embodiment, multiple pictures may be installed in the cache, or some other memory contained in the handset, and when a call is received, the handset can choose the appropriate picture based on matching CLI information.

In embodiments of the present invention, the PCLI information may include a picture of a caller as described above, may include additional information about the caller, or may include other information, such as that typically included on a business card, a company logo, or any other image and/or text that a caller chooses to include in his or her personalized PCLI information.

Figure 5:
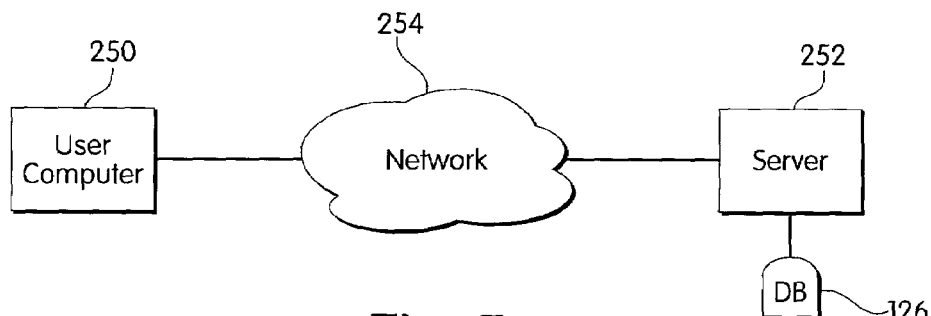
FIG. 5 is functional block diagram of a system used by a user to load or edit PCLI information in embodiments of the present invention.

In one embodiment of the present invention, which will now be described with reference to FIG. 5, a user of the above-described PCLI telephony system can enter and edit his or her PCLI information by accessing the PCLI database over the Internet. FIG. 5 shows a user computer 250 coupled to a server 252 over a network 254 such as the Internet. The server 252 is coupled to the PCLI database 126. Using the system shown in FIG. 5, a user can access the database 126 to change PCLI information contained in the database or to initially register as a PCLI user and enter PCLI information. In one embodiment, each user is assigned a user name and password to ensure that access to each user's information is secure. The server 252 may also function as the PCLI manager.

Figure 6:
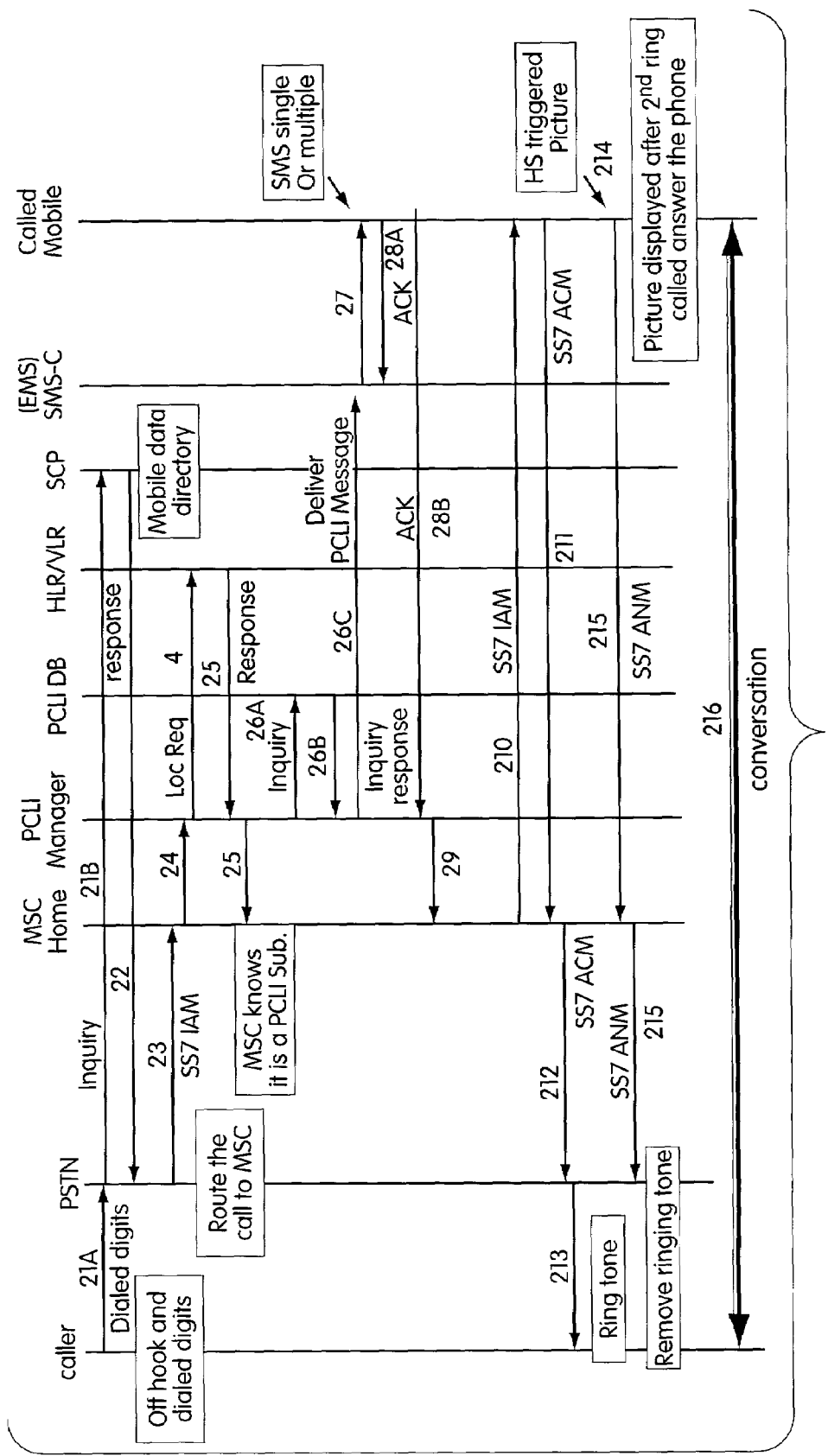
FIG. 6 is a signaling flow diagram that provides step-by-step flow of the signaling procedure of a telephone system to accomplish picture caller line identification in a landline handset to mobile handset call in embodiments of the present invention.

Embodiments of the present invention that provide caller PCLI information are not limited to mobile to mobile telephone calls, but as will now be described, are also applicable to landline to mobile telephone calls. FIG. 6 is a signaling flow diagram that provides step-by-step flow of the signaling procedure of a telephone system to accomplish picture caller line identification in a landline handset to mobile handset call in embodiments of the present invention. In the flow diagram of FIG. 6, a user of the landline handset 120 (see FIG. 1) initiates (21A) a call through a switch in the public switching telephone network (PSTN) 118. The PSTN switch receives the call and sends an inquiry (21B) to the mobile database directory, which resides within the service control point (SCP), which may be collocated with the MSC. The SCP responds (22) to the PSTN switch with the mobile number information.

Upon receiving (23) the mobile number information, the PSTN switch routes the call to the first MSC along with an IAM message. The MSC then sends an inquiry (24) to the HLR/VLR through the PCLI manager for location information of the mobile party being called. The HLR/VLR responds (25) to the MSC with the user's profile, such as type of service (i.e., PCLI), and with location information. The PCLI manager then sends (26A) an inquiry to the PCLI database to map CLI information received from the HLR/VLR to PCLI information contained in the PCLI database. The PCLI manager receives (26B) the PCLI information from the PCLI database and sends it (26C) to the EMS for an immediate delivery.

The PCLI information is delivered (27) by the SMS using the short message service transport protocol using one single short message or multiple short messages, depending on the size of the data being delivered. The second mobile handset 102B stores the PCLI information in memory, and sends an acknowledgement (28A) to the EMS, which in turn sends an acknowledgement (28B) to the PCLI manager. The PCLI manager then sends an acknowledgement message to the MSC (29). After receiving the acknowledgement, the MSC sends (210) an SS7 IAM setup message. The called party's switch (the second MSC) upon receiving the IAM message analyzes the message and makes a determination as to whether the called party is idle.

The called party's switch then sends back an Address Complete Message (ACM) (211) to the first MSC and the first MSC, upon receipt of the ACM, sends an ACM signal to the PSTN switch (212). The PSTN switch sends ISDN alert to the caller (213) and the caller hears a ring tone. The ring tone is then activated at the mobile handset 102B (214), and after the second ring, the PCLI information is displayed. When the called party answers the call, the second MSC sends (215) an SS7 Answer Message (ANM) to the first MSC, and the first MSC sends the ANM message to the PSTN switch. After receiving the ANM message, the PSTN switch removes the ring tone, and the caller is connected to the called party to allow conversation (216) to occur.

In embodiments of the present invention described above, a called party may identify a calling party using PCLI. However, the identification is associated with the calling party's handset, rather than with the particular individual making the call. In another embodiment of the present invention, which will now be described with reference to FIGS. 7 and 8, a PCLI system 300 allows multiple users of a handset to be individually identified by a called party. In one embodiment, the identification of the user is accomplished using an Interactive Voice Recognition (IVR) system that identifies a password uttered by the user. In another embodiment, the identification of the user may be accomplished by identifying a particular audio signature of the user.

Figure 7:
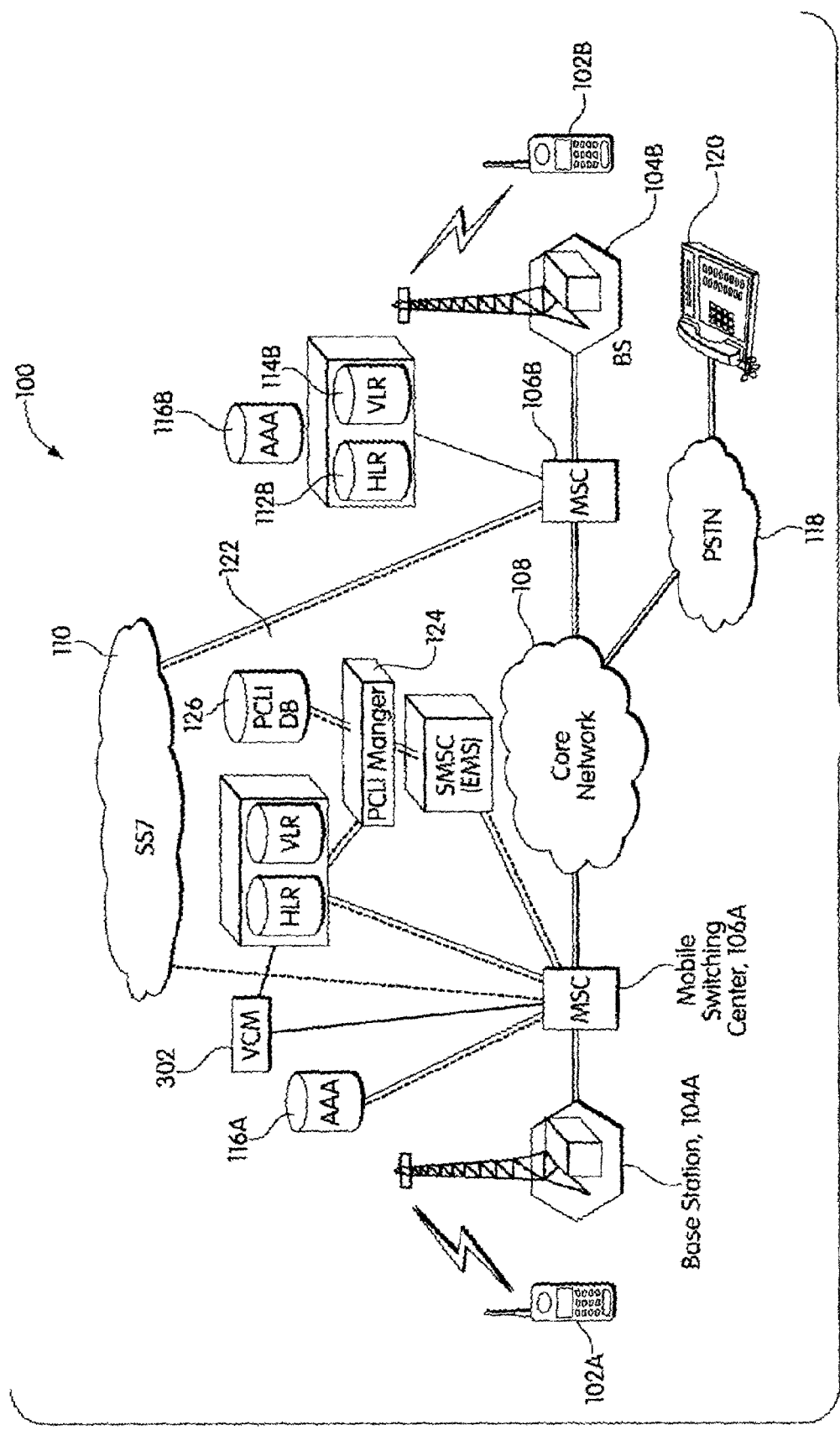
FIG. 7 is a functional block diagram of a mobile telephone system in accordance with another embodiment of the present invention.

FIG. 7 provides a functional block diagram of the PCLI system 300. In one embodiment, the PCLI system 300 includes all of the elements of system 100 and also includes a Voice Call Manager (VCM) 302. The common elements of system 300 with system 100 are described in the description of system 100 and are identified in FIG. 7 using the same reference numerals as FIG. 1. In one embodiment, the VCM 302 is implemented as a software module executing in one or more servers that are performing functions of the first mobile switching center 106A or on servers that communicate with the mobile switching center and perform some other network function, such as a voice mail system or a call manager system. In different embodiments, the VCM may incorporate one of a number of available IVR systems, such as the Tel@go™ system available from Comverse Network Systems, Wakefield, Mass.

Figure 8:
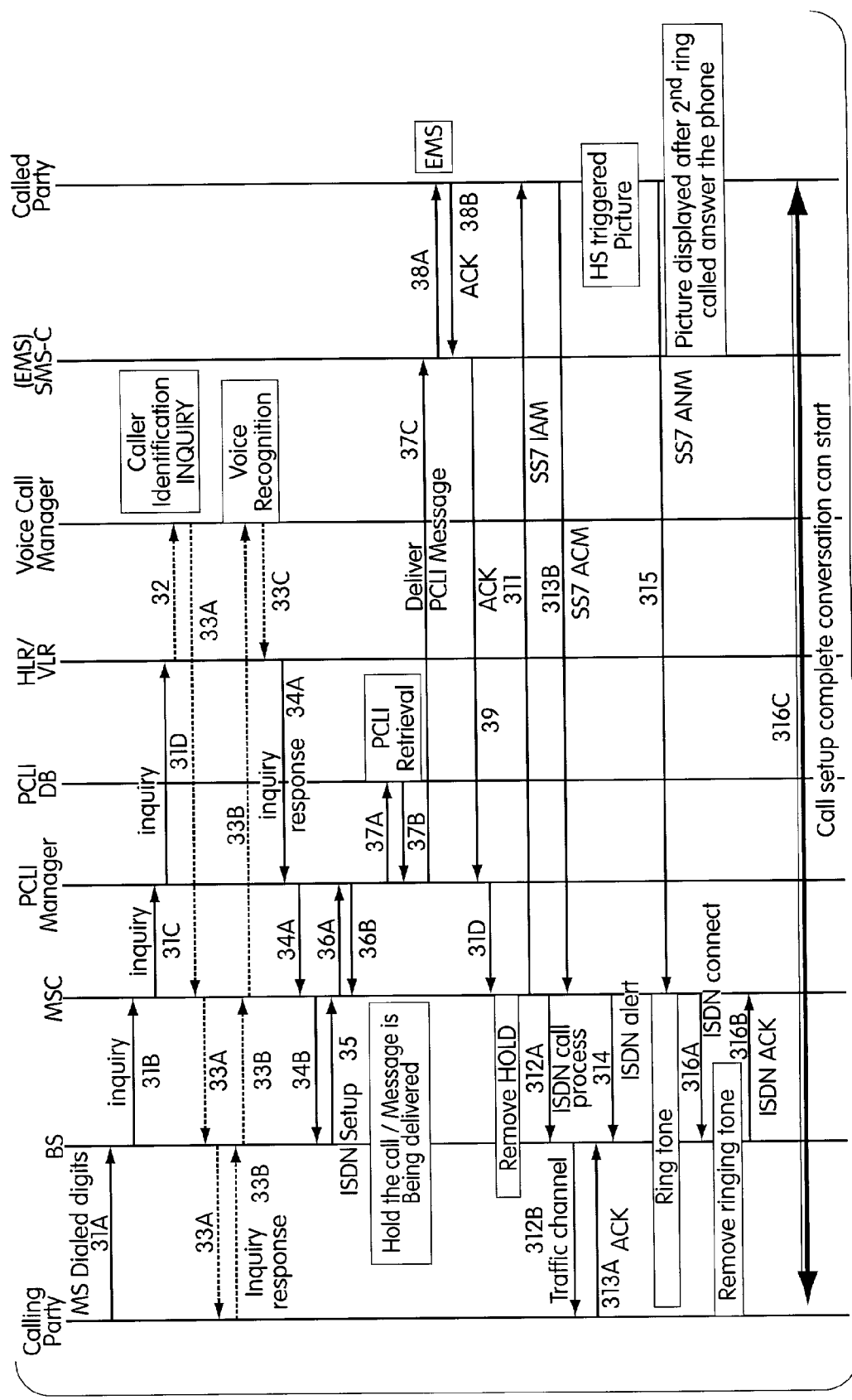
FIG. 8 is a signaling flow diagram that provides step-by-step flow of the signaling procedure of the system shown in FIG. 7.

A method for operating system 300 to complete a call from a mobile station (handset 102A) to another mobile station (handset 102B) using multi-caller PCLI in accordance with one embodiment of the present invention will now be described with reference to FIG. 8. FIG. 8 is a signaling flow diagram of the signaling procedure used in the system 300. The mobile handset 102A initiates (31A) a call using an access channel to the first base station 104A. The call is passed (31B) to the MSC 106A. The MSC 106A then queries (31C and 31D) the HLR 112A or the VLR 112B, depending on whether the mobile station is operating in its home network or a visited network.

The HLR or VLR then makes an inquiry (32) to the VCM 302 for identification of the particular caller of the incoming call. The VCM issues a caller identification inquiry (33A) to the caller to say or enter a unique password. The caller then responds (33B), and the VCM identifies the caller, from one of a number of pre-registered users of the handset 102A based on the caller's response. In different embodiments of the present invention, the caller's response may be a particular spoken word or phrase or may be the pressing of one or more keys on the handset 102A. The VCM sends (33C) the identity of the caller to the HLR or VLR.

The HLR or VLR responds (34A) to the MSC request with the user's profile attached to the acknowledgement message. The first MSC then sends (34B) the user's profile to the first base station, and the first base station then sends (35) an ISDN setup message to the first MSC. The PCLI manager then intervenes (36A) and instructs (36B) the MSC to hold or temporarily suspend the setup of the call. While the call is held, the PCLI manager queries (37A) the PCLI database to obtain PCLI information for the caller. The information is sent to the PCLI manager (37B), and the PCLI manager sends (37C) the PCLI information on to the Enhanced Message System (EMS) for immediate delivery to the called party's handset. The information is delivered (38A) to the handset using the short message service transport protocol, and an acknowledgement of receipt is sent (38B) from the handset to the EMS. The EMS then sends (39) an acknowledgement message to the PCLI manager.

Upon receipt of the acknowledgement of delivery of the information to the second handset, the PCLI manager instructs (310) the first MSC to remove the hold on the call and to continue with the call setup. At this point, the first MSC sends (311) an SS7 ISDN setup message called Initial Address Message (IAM), and upon receiving the IAM, the called party makes a determination that the called party is idle. At about the same time that the IAM message is sent, the first MSC returns (312A) an ISDN call message to the base station. The base station then sends (312B) a traffic channel assignment message to the mobile subscriber (handset 102A) through a paging channel. The handset sends an acknowledgement (313A) to the base station to confirm the traffic channel assignment, and at about the same time, the called party's switch (313B) sends back an address complete message (ACM) to the first MSC confirming reception of the IAM message. A ringing tone is also sent by the first MSC 106A to the calling party's handset.

At point 314 in the procedure, the first MSC sends an ISDN alert message to the first base station, and the ringing tone is activated in the first handset. After the second ring at the second mobile handset 102B, the PCLI information stored in the second handset is displayed. The called party's switch then sends back (315) an SS7 answer message (ANM) to the first MSC. Upon receiving the ANM message, the first MSC sends an ISDN connect message (316A) to the first base station and removes the ringing tone. The base station sends an ISDN acknowledgement message (316B) to the first MSC, and conversation between the two parties can then begin (316C).

The operation of system 300 discussed above is similar to the operation of system 100 discussed further above with reference to FIGS. 1 and 2, except that system 300 includes additional procedures to accommodate multi-caller PCLI using the voice call manager. In addition to being used with system 100, the voice call manager and multi-caller PCLI features of the present invention may also be used with other PCLI systems.

In the operation of the system 300 described above, a user of a handset is identified based on a response to a signal from the VCM. In another embodiment, in addition to providing identification of a user, a user may select a particular PCLI image to use each time a call is made. The selection of the particular image may be made by pressing a key in response to a prompt or by uttering a particular phrase. For example, in response to a prompt "What image would you like to send?" from the VCM, a user may respond with "business" for a picture of the user in a business suit or for an image of the user's business card, or the user may respond "casual" for a casual picture or greeting to be selected as the PCLI information.

In one embodiment of the present invention that uses voice signature recognition, a user may be asked to repeat a particular phrase, and the VCM identifies the user based on a voice signature match with a stored voice signature for the user. If a match is not found, in one embodiment, the user may be asked to utter a password or enter a password on the keypad before the system will proceed with the call.

Users of the system 300 may register with the system and enter PCLI information over the Internet using a procedure like that described above with reference to FIG. 5. In addition, in embodiments of the invention, users may be required to provide voice samples either over a telephone network or the Internet to the system 300.

In embodiments discussed above, the EMS is used to transfer pictures to handsets. In other embodiments, other systems may be used to transmit PCLI data to a handset. Further, in future generations of mobile telephony systems, PCLI information may be transmitted with CLI information.

In embodiments of the present invention described above, two MSC's are used in the call process, however, as understood by those skilled in the art, in some call scenarios, only one MSC may be used.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A method comprising:
    providing interactive access to caller identification information associated with a caller, wherein the caller interactively enters and edits the caller identification information via the Internet;
    receiving a request for a call from the caller using a subscriber handset to a called party over a first wireless communication system;
    identifying the caller identification information associated with the caller;
    retrieving the caller identification information associated with the caller, wherein the caller identification information includes a PCLI header and an image;
    compressing the image in the caller identification information;
    forwarding the PCLI header and the compressed image in the caller identification information to the called party over a second wireless communication system;
    comparing the PCLI header received over the second wireless communication systems with a caller ID received over the first wireless communication system;
    displaying the image to the called party if the PCLI header matches the caller ID; and
    suspending the call over the first wireless communication system until a verification of receipt is received over the second wireless communication system.

2. The method of claim 1, wherein identifying includes:
    sending a prompt to the caller;
    receiving a response to the prompt from the caller; and
    identifying the caller identification information based on the response received from the caller.

3. The method of claim 2, wherein the response includes a word spoken by the caller, and wherein identifying includes using a voice recognition system to identify the response received from the caller.

4. The method of claim 3, wherein identifying includes using a voice recognition system to identify the caller based on a voice signature of the caller.

5. The method of claim 3, wherein the caller is one of a plurality of registered callers for the subscriber handset, and wherein identifying includes identifying the caller from the plurality of registered callers.

6. The method of claim 1, wherein the second communications system is a short message system implemented using a short message transport protocol.

7. The method of claim 2, wherein receiving a request for a call includes receiving a request for a call to a mobile handset.

8. The method of claim 7, wherein receiving a request for a call includes receiving a request for a call from a mobile handset.

9. The method of claim 1, wherein the caller is one of a plurality of registered callers for the subscriber handset, and wherein identifying includes identifying the caller from the plurality of registered callers.

10. The method of claim 1, further comprising:
    after receiving verification of receipt of the caller identification information by the called party, completing the call.

11. A system for providing picture caller line identification (PCLI) information in a mobile telephony system, the system comprising:
    at least one storage unit to store PCLI information for a plurality of users of the telephony system, wherein the PCLI information includes a PCLI header and an image; and
    at least one processor coupled to the storage unit and for coupling to the telephony system, the processor being programmed to connect to a computer network, to provide the plurality of users secured interactive access to the storage unit, to enable the plurality of users to interactively enter and edit the PCLI information, detect a request for a call from a caller using a subscriber handset to a called party, wherein the call includes a caller ID associated with the handset, to determine whether the caller is a registered caller, to identify PCLI information associated with the caller, retrieve the PCLI information associated with the caller from the storage unit, to digitally compress the PCLI information, to forward the caller ID associated with the handset over a first communication system and the compressed PCLI information over a second communication system to the called party, to compare the PCLI information received over the second communication system with a caller ID received over the first communication system, to display the image to the called party if the PCLI information matches the caller ID, to receive a verification signal from the called party after receipt of the PCLI information, and to send a signal to the telephony system to send a ringing tone to the called party after receipt of the verification signal.

12. The system of claim 11, wherein the system is further programmed to
send a prompt to the caller;
receive a response to the prompt from the caller; and
identify the picture caller identification information based on the response received from the caller.

13. The system of claim 12, wherein the response is a word spoken by the caller, and the system further comprises a voice recognition subsystem, coupled to the at least one processor, that identifies the response received from the caller.

14. The system of claim 13, wherein the voice recognition subsystem identifies the caller based on a voice signature of the caller.

15. The system of claim 13, wherein the caller is one of a plurality of registered callers for the subscriber handset, and wherein the at least one processor is programmed to identify the caller from the plurality of registered callers.

16. The system of claim 11, wherein the caller is one of a plurality of registered callers for the subscriber handset, and wherein the at least one processor is programmed to identify the caller from the plurality of registered callers.

17. The system of claim 11, wherein the telephony system connects the call over a first communications system, and wherein the processor is further programmed to forward the PCLI information to the called party over a second communications system.

18. A system for providing picture caller line identification (PCLI) information in a mobile telephony system, the system comprising:
at least one storage unit to store PCLI information for a plurality of users of a telephony system;
means for connecting to a computer network, for providing the plurality of users secured interactive access to the storage unit, and for enabling the plurality of users to interactively enter and edit the PCLI information;
means for detecting a request for a call over a first communication system from a caller using a subscriber handset to a called party, for determining whether the caller is a subscriber to the system, for identifying the caller, for retrieving PCLI information for the caller from the at least one storage unit, for compressing the PCLI information, and for forwarding the compressed PCLI information for the caller to the called party over a second communication system;
means for comparing the PCLI information received over the second communication system with a caller ID received over the first communication;
means for displaying the compressed PCLI information to the called party if the PCLI information matches the caller ID; and
means for receiving a verification over the second communication system from the called party when the PCLI information for the caller is received by the called party, and for sending the called party a ringing tone after the verification is received.

19. The system of claim 18, further comprising means for sending a prompt to the caller, and for receiving a response to the prompt that includes a word spoken by the caller, and wherein the means for identifying the caller includes means for identifying the caller based on the response to the prompt.

20. The system of claim 18, further comprising means for identifying the caller based on a voice signature of the caller.

21. The system of claim 18, wherein the caller is one of a plurality of registered callers for the subscriber handset, and wherein the system includes means for identifying the caller from the plurality of registered callers.

22. The system of claim 18, wherein the telephony system connects the call over a first communications system, and further comprising means for forwarding the PCLI information to the called party over a second communications system.

23. A computer readable medium storing at least one program for controlling a mobile telephony system to:
store caller identification information for a plurality of users of the mobile telephony system;
provide interactive access to caller identification information from a computer network, wherein the computer network is connected to the Internet;
receive a request for a call from a caller using a subscriber handset to a called party, wherein the request includes a caller ID associated with the handset;
determine whether a caller is a registered user of the mobile telephony system;
identify caller identification information associated with the caller;
retrieve the caller identification information associated with the caller, wherein the caller identification information includes a header field and an image;
compress the image in the caller identification information;
forward the caller ID associated with the handset to the called party over a first communication system;
forward the caller identification information to the called party over a second communication system;
compare the caller identification information header field received over the second communication system with a caller ID received over the first communication system
display the image to the called party if the caller identification header field matches the caller ID
receive a verification of receipt of the image by the called party; and
send the called party a ringing tone after receiving the verification.

24. The computer readable medium of claim 23, wherein the program controls the system to:
send a prompt to the caller;
receive a response to the prompt from the caller; and
identify the caller identification information based on the response received from the caller.

25. The computer readable medium of claim 24, wherein the response to the prompt is a spoken word, and wherein the program controls the system to identify the word.

26. The computer readable medium of claim 25, wherein the program controls the system to recognize a voice signature of the caller.

27. The computer readable medium of claim 23, wherein the second communications system is a short message system implemented using a short message transport protocol.

* * * * *